United States Patent [19]

Howland et al.

[11] Patent Number: 4,706,468

[45] Date of Patent: Nov. 17, 1987

[54] COMPARTMENTALIZED TRANSPORT REFRIGERATION SYSTEM

[75] Inventors: Leland L. Howland, Belle Plaine; Jayaram Seshadri, Minneapolis, both of Minn.

[73] Assignee: Thermo King Corporation, Minneapolis, Minn.

[21] Appl. No.: 36,539

[22] Filed: Apr. 9, 1987

Related U.S. Application Data

[62] Division of Ser. No. 915,827, Oct. 6, 1986.

[51] Int. Cl.$^4$ ............................................. F25B 5/00
[52] U.S. Cl. ...................................... 62/199; 62/239; 62/278
[58] Field of Search ................ 62/117, 199, 200, 239, 62/152, 278

[56] References Cited

U.S. PATENT DOCUMENTS

| | | | |
|---|---|---|---|
| 2,237,249 | 4/1941 | Fisher | 62/200 |
| 2,403,818 | 7/1946 | McGrath | 62/200 |
| 2,960,840 | 11/1960 | Hosken et al. | 62/199 X |
| 3,664,150 | 5/1972 | Patterson | 62/152 X |

Primary Examiner—William E. Tapolcai
Attorney, Agent, or Firm—D. R. Lackey

[57] ABSTRACT

A compartmentalized transport refrigeration system, and method of operating same, in which a host refrigeration unit controls the temperature of the air in a front compartment of a trailer, and a remote evaporator unit controls the temperature of the air in a rear compartment. In order to increase the heating and cooling capacity of the remote evaportor, the host unit is prevented from going into a heating mode in response to predetermined conditions, and more, or all in certain instances, of the discharge gas from the host compressor is made available for the remote evaporator.

3 Claims, 6 Drawing Figures

COMPARTMENTALIZED TRANSPORT REFRIGERATION SYSTEM

This is a division of application Ser. No. 06/915,827 filed Oct. 6, 1986.

CROSS REFERENCE TO RELATED APPLICATION

Our co-pending application Ser. No. 918,601 filed concurrently with the present application also relates to a compartmentalized transport refrigeration system.

BACKGROUND OF THE INVENTION

1. Field of the Invention:

The invention relates in general to transport refrigeration systems, and more specifically to transport refrigeration systems in which the temperature of the air in each of two or more separate compartments of a trailer is to be controlled.

2. Description of the Prior Art:

Transport refrigeration systems often utilize multi-temperature control for controlling the air temperature in two or more separate compartments of a multi-temperature trailer. For example, a trailer may carry a frozen load in the front compartment, which is controlled by the main refrigeration unit called the host unit, and fresh loads in the one or more remote compartments, which are controlled by remote evaporators. Some prior art systems utilize electric heaters supplied by an alternator to provide heat for a remote compartment. In order to provide the necessary alternator output, the dedicated prime mover, such as a Diesel engine, is operated at the higher of two normal operating speeds used at various times during the process of controlling the temperatures of the loads. For example, the higher of the two speeds may be 2200 RPM and the lower may be 1400 RPM. Operating the engine at high speed, however, when a rear compartment requires heat, often results in the front compartment getting extremely cold. While the compartments are separated and heat insulated from one another, the extreme cold in the forward compartment may leak to the adjacent compartment, which thus increases the need for heat in the adjacent compartment. The engine must thus run a longer time at the higher RPM to provide more heat for the rear compartment, while providing still more cold for the front compartment, and the system "fights" itself.

Hot gas from the host unit has been used to defrost the remote evaporator, but the use of hot gas to heat the remote evaporator has had disadvantages. For example, ambient temperatures below 40 degrees F. limit the heating capacity of the remote evaporator.

Remote evaporators have also suffered disadvantages not related to heating. For example, in systems which utilize a three-way valve to select host heating and cooling modes, the remote evaporator cannot go into a cooling mode when the host unit is in a heating mode, because the three-way valve is switched from a cooling position to a heating position by a pilot solenoid when the heat unit requires heat.

SUMMARY OF THE INVENTION

Briefly, the present invention is a new and improved compartmentalized transport refrigeration system, and method of operating same, including a host refrigeration unit which controls the temperature of the air in a first or front compartment of a trailer, and a remote evaporator unit which controls the temperature of the air in a second or rear compartment. The host unit includes a compressor, condenser, receiver, evaporator, accumulator, and liquid, hot gas and suction lines. The remote unit includes liquid, hot gas and suction lines selectively connectable to the liquid, hot gas and suction lines, respectively, of the host unit, and an evaporator. The host unit normally controls the temperature in the first compartment by heating and cooling modes, but in response to predetermined conditions, the host unit is prevented from going into a heat mode. When the host unit is not in a heating mode, all of the discharge gas from the compressor is made available for use by the remote evaporator unit during certain operating conditions. Thus, the heating and cooling capabilities of the remote evaporator unit are significantly improved.

In a first embodiment of the invention, the host unit is prevented from going into a heating mode when: (a) the set point of the host unit is below a predetermined temperature, called the lockout temperature, which may be 15 degrees F., for example, and (b) the remote evaporator unit is in a cooling mode. Thus, the cooling requirements of the remote unit are satisfied without the possibility of the host unit going into a heating mode. If the remote unit requires heat while the host unit is in a cooling mode, all of the hot compressor gas is directed to the remote evaporator unit by preventing the hot gas from entering the condenser, and by directing the output of the remote evaporator to the receiver instead of to the accumulator. Thus, more liquid refrigerant is forced from the receiver and the heating capability of the remote evaporator unit is greatly enhanced.

A second embodiment of the invention is similar to the first, except a liquid line control is provided in the host unit. Further, the controls are interlocked such that the host liquid line control cannot close unless the remote unit is cooling, insuring that refrigerant is always being circulated through the compressor. The second embodiment thus allows the host unit to cycle between cooling and null modes while the remote unit is cooling.

BRIEF DESCRIPTION OF THE DRAWINGS

The invention may be better understood, and further advantages and uses thereof more readily apparent, when considered in view of the following description of exemplary embodiments, taken with the accompanying drawings, in which.

DESCRIPTION OF PREFERRED EMBODIMENTS

Figure 1:
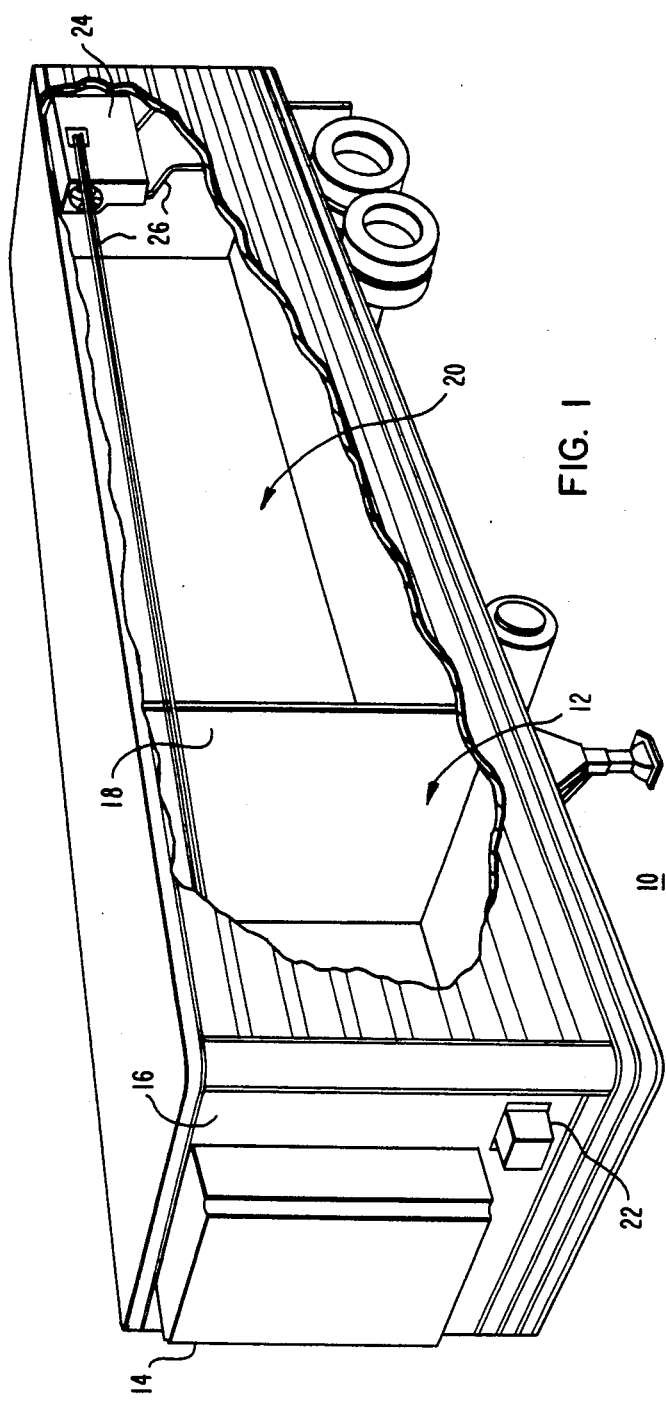
FIG. 1 is a perspective view, shown partially cut away, of a compartmentalized trailer which may have a transport refrigeration system constructed according to the teachings of the invention.

Referring now to the drawings, and to FIG. 1 in particular, there is shown a compartmentalized trailer 10 which may utilize the teachings of the invention. Trailer 10 includes a front compartment 12 which has its air temperature controlled by the main or host refrigeration unit 14 which is mounted on the vertical front surface 16 of the trailer 10. The front compartment 12 is normally used for frozen loads, with a typical set temperature being −10 degrees F. Vertical partition or wall 18 insulatingly separates the front compartment 12 from one or more rear compartments, with a single rear compartment 20 being shown for purposes of example.

Rear compartment 20 has its air temperature controlled by a remote refrigeration unit which includes a remote control box 22 mounted on the front surface 16 of the trailer 10, and one or more remote evaporator units in the rear compartment 20, with a single remote evaporator unit 24 being shown for purposes of example. Remote evaporator unit 24 includes piping and wiring, shown generally at 26, which connects the remote evaporator unit 24 with the host refrigeration unit 14 and with its remote control box 22. The rear compartment 20 is normally used for fresh loads, with the temperature set point being accurately controllable down to 35 degrees F. The specific temperature set point is dictated by the nature of the load being preserved.

Trailers with two remote compartments typically utilize a remote evaporator unit in each, and each has its own remote control box for separate temperature control of each compartment. It will become apparent from the description of a single rear compartment having a single remote evaporator unit how the teachings of the invention may be applied to trailer arrangements having two rear compartments, or a single rear compartment with two spaced remote evaporator units.

For purposes of example, the invention will be described with the host unit controlling a frozen load and the remote unit a fresh load, but the invention enables any desired combination, as desired by the user.

Figure 2:
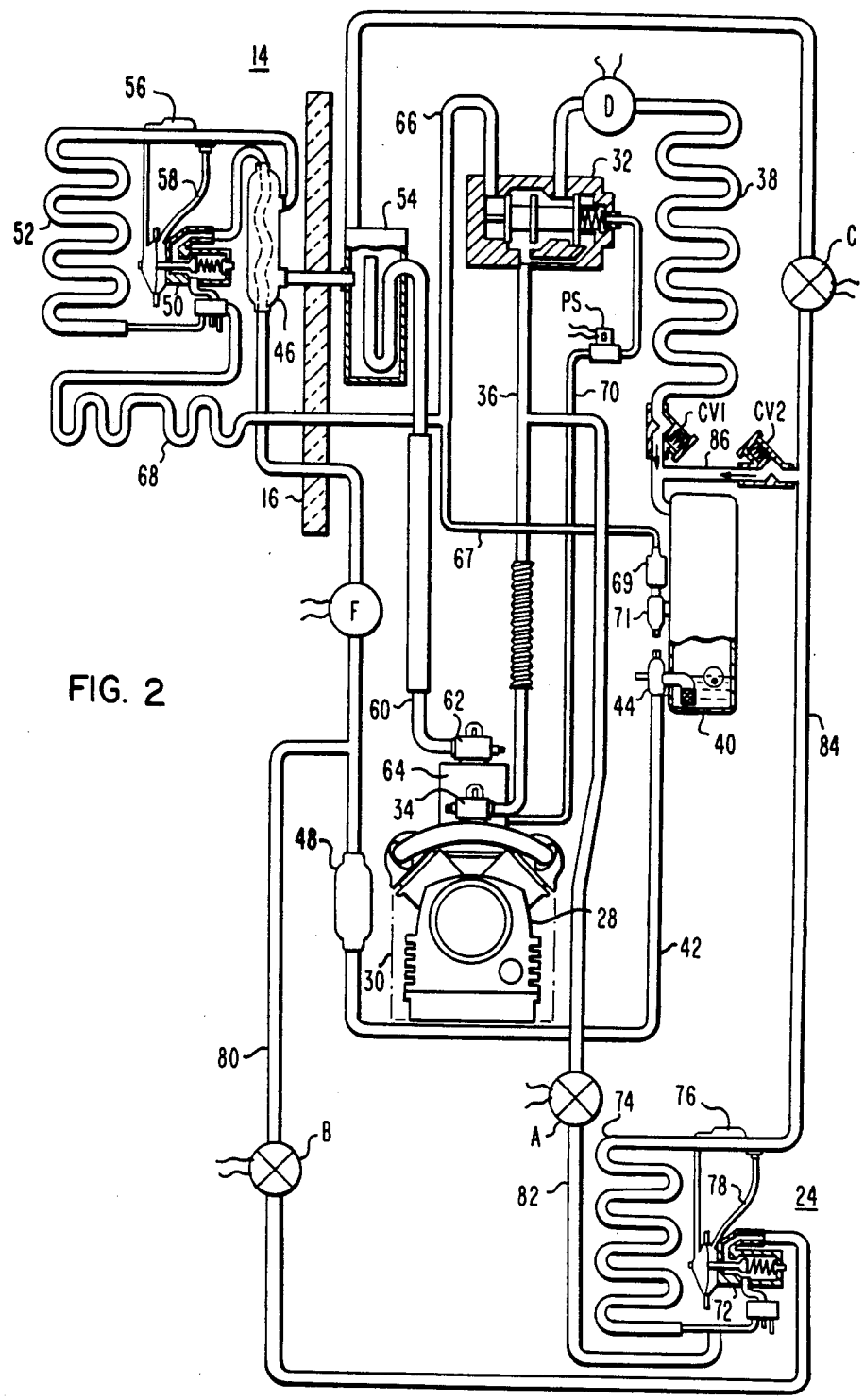
FIG. 2 is a schematic piping diagram of a transport refrigeration system constructed according to the teachings of the invention, which may be used in the compartmentalized trailer shown in FIG. 1.

FIG. 2 is a schematic piping diagram of the host refrigeration unit 14, the remote evaporator unit 24, and the piping interconnections between the units. FIG. 2 also illustrates the locations of controllable valves and check valves, which will be referred to when describing two different embodiments of the invention. For purposes of example, the various valves and solenoids will be described as having a specified normal deenergized position, by it is to be understood that the opposite position or condition may be selected by merely modifying the associated control accordingly.

U.S. Pat. Nos. 3,219,102; 4,325,224; and 4,419,866, which are assigned to the same assignee as the present application, describe transport refrigeration systems in detail, and they are hereby incorporated into the present application by reference so that the following description may concentrate on the inventive aspects of the compartmentalized transport refrigeration system.

More specifically, the host refrigeration unit 14 comprises a closed fluid circuit which includes a refrigerant compressor 28 driven by a prime mover such as an internal combustion engine indicated generally by broken outline 30. The discharge ports of the compressor 28 are connected to an inlet port of a three-way valve 32 via a discharge service valve 34 and a hot gas conduit on line 36. The functions of the three-way valve 32, which has heating and cooling positions, may be provided by separate valves, as desired.

According to the teachings of the invention, one of the output ports of the three-way valve 32 is connected to the inlet side of a condenser coil 38 via a normally open solenoid operated condenser inlet valve D. This is the cooling position of the three-way valve 32. The outlet side of the condenser coil 38 is connected to a receiver tank 40 via a one-way condenser check valve CV1 which enables fluid flow only from the outlet side of the condenser coil 38 to the receiver tank 40. An outlet valve 44 on the receiver tank 40 is connected to a heat exchanger 46 via a liquid conduit or line 42 which includes a dehydrator 48.

In one embodiment of the invention, as will be hereinafter described in detail, a normally open solenoid operated liquid line valve F is also disposed in the liquid line 42, between the heat exchanger 46 and the dehydrator 48.

The liquid refrigerant from liquid line 42 continues through a coil in the heat exchanger 46 to an expansion valve 50. The outlet of the expansion valve 50 is connected to the input side of an evaporator coil 52, and the outlet side of evaporator coil 52 is connected to a closed accumulator tank 54 by way of the heat exchanger 46. The expansion valve 50 is controlled by an expansion valve thermal bulb 56 and an equalizer line 58.

An accumulator tank 54 is recommended in order to assure proper operation of the refrigeration system at all ambients. However, it is not essential to the invention, and may be omitted.

Gaseous refrigerant in the accumulator tank 54 is directed to the suction port of compressor 28 via a suction conduit or line 60, a suction line service valve 62, and a suction throttling valve 64.

In the heating position of three-way valve 32, a hot gas line or conduit 66 extends from a second outlet port of the three-way valve 32 to the inlet side of the evaporator coil 52 via a defrost pan heater 68 located below the evaporator coil 52. A by-pass conduit or pressurizing tap 67 extends from the hot gas line 66 to the receiver tank 40 via a by-pass check valve 69 and a by-pass service valve 71. Three-way valve 32 is controlled by pressure obtained from the intake side of compressor 28 via a conduit 70 which includes a normally closed pilot solenoid valve PS. When the solenoid operated valve PS is closed, the three-way valve 32 is spring biased to the cooling position, to direct the hot, high pressure gas from the compressor 28 to the condenser coil 38. Condenser coil 38 removes heat from the gas and condenses the gas to a lower pressure liquid. When the evaporator requires defrosting, and also when a heating mode is required to hold the set point selected by a thermostat, the pilot solenoid valve PS is opened and the compressor pressure operates the three-way valve 32 to its heating position. The heating position causes the hot, high pressure gas from the compressor 28 to flow through the defrost pan heater 68 and then through the evaporator coil 52, by-passing the expansion valve 50. The heating position of the three-way valve 32 also pressurizes the receiver tank 40 via by-pass conduit 67. During the defrost cycle, the evaporator fan (not shown) is not operated, while during the heating cycle required to hold the set temperature, the evaporator fan is operated.

The remote evaporator unit 24 includes an expansion valve 72, an evaporator coil 74, a thermal bulb 76, and an equalizer line 78. A remote liquid line 80 interconnects the liquid line 42 of the host unit 14 with the remote expansion valve 72. The remote liquid line 80 taps the host liquid line 42 at a point between the dehydrator 48 and the host liquid line valve F. A normally closed solenoid operated liquid line valve B is disposed in the remote liquid line 80, which, when energized to open the valve, initiates a cooling mode in the remote evaporator unit 24.

The remote evaporator unit 24 also includes a remote hot gas line 82 which interconnects the input side of the remote evaporator coil 74 with the hot gas line 36 of the host unit 14. A normally closed, solenoid operated hot gas valve A is disposed in the remote hot gas line 82, which, when energized to open the valve, initiates a heating mode in the remote evaporator unit 24.

The remote evaporator unit 24 is completed by a remote suction line 84 which may tap the host suction line between the heat exchanger 46 and the accumulator tank 54, or which may be directly connected to the accumulator tank 54, as illustrated. A normally closed remote suction line valve C is disposed in the remote suction line 84, and a by-pass conduit 86 having a one-way check valve CV2 connects the remote suction line 84 with the input of the receiver tank 40. Suction line valve C is disposed in the portion of the remote suction line 84 which is located between the by-pass conduit 86 and the accumulator tank 54. The one-way check valve CV2 is connected to allow fluid flow from the remote suction line 84 to the receiver tank 40.

Figure 3:
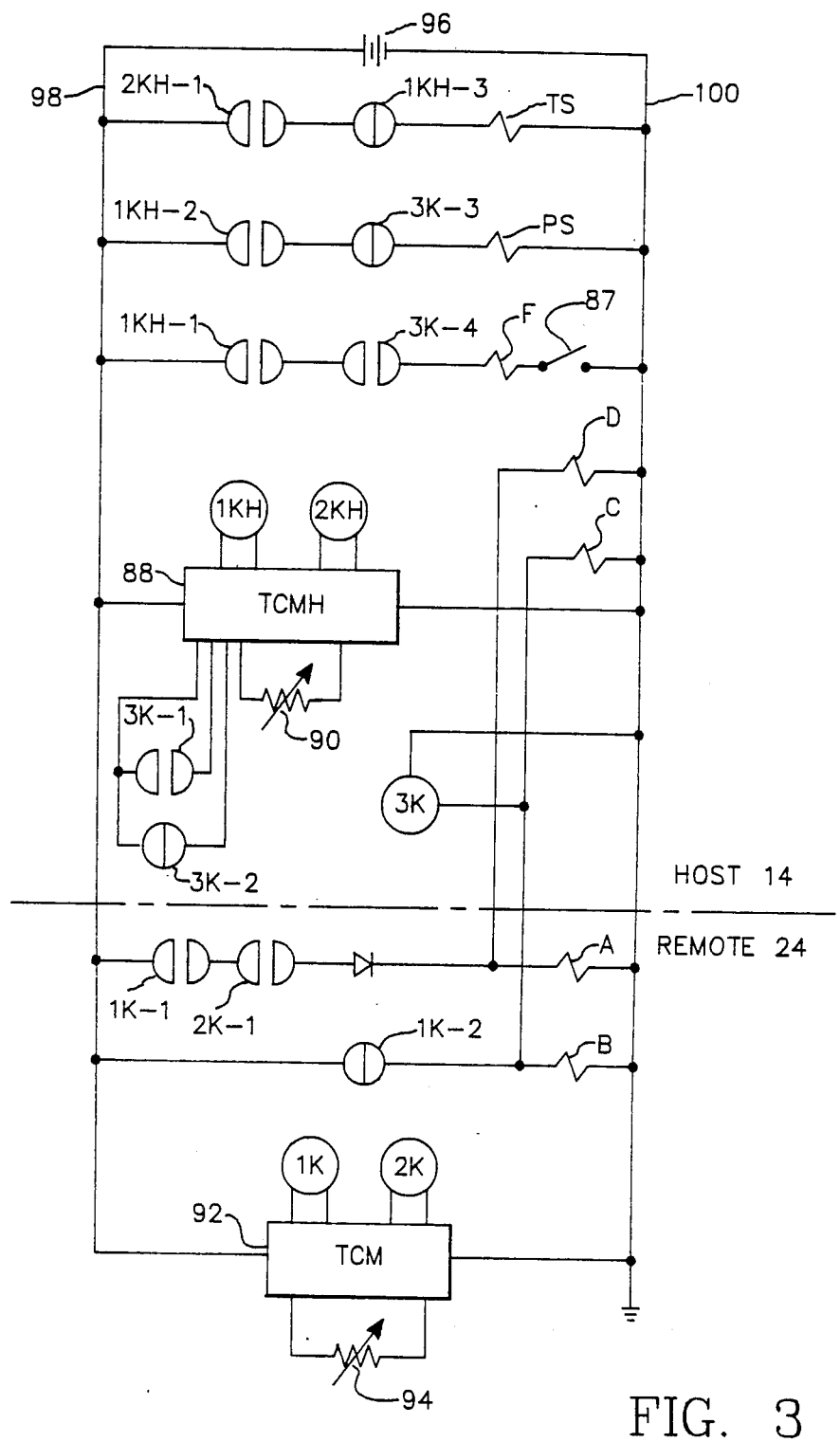
FIG. 3 is a schematic electrical diagram illustrating a heat lockout relay which locks out all heat modes, i.e., high speed heat and low speed heat, in the host unit when the remote unit is in a cooling mode and the set temperature of the host unit is below the heat lockout temperature which normally only locks out only the high speed heat mode.

FIG. 3 is an electrical schematic diagram of the host unit 14 and the remote unit 24. In a first embodiment of the invention the host liquid line valve F is not utilized and is thus shown in the electrical schematic with a manually operable switch 87. In the first embodiment of the invention switch 87 is placed in its open position, and since valve F is a normally open valve, i.e., it must be energized to close it, it will have no effect. In a second embodiment of the invention, switch 87 is closed to render valve F operable. The invention will first be described without valve F.

Figures 4, 5, 6:
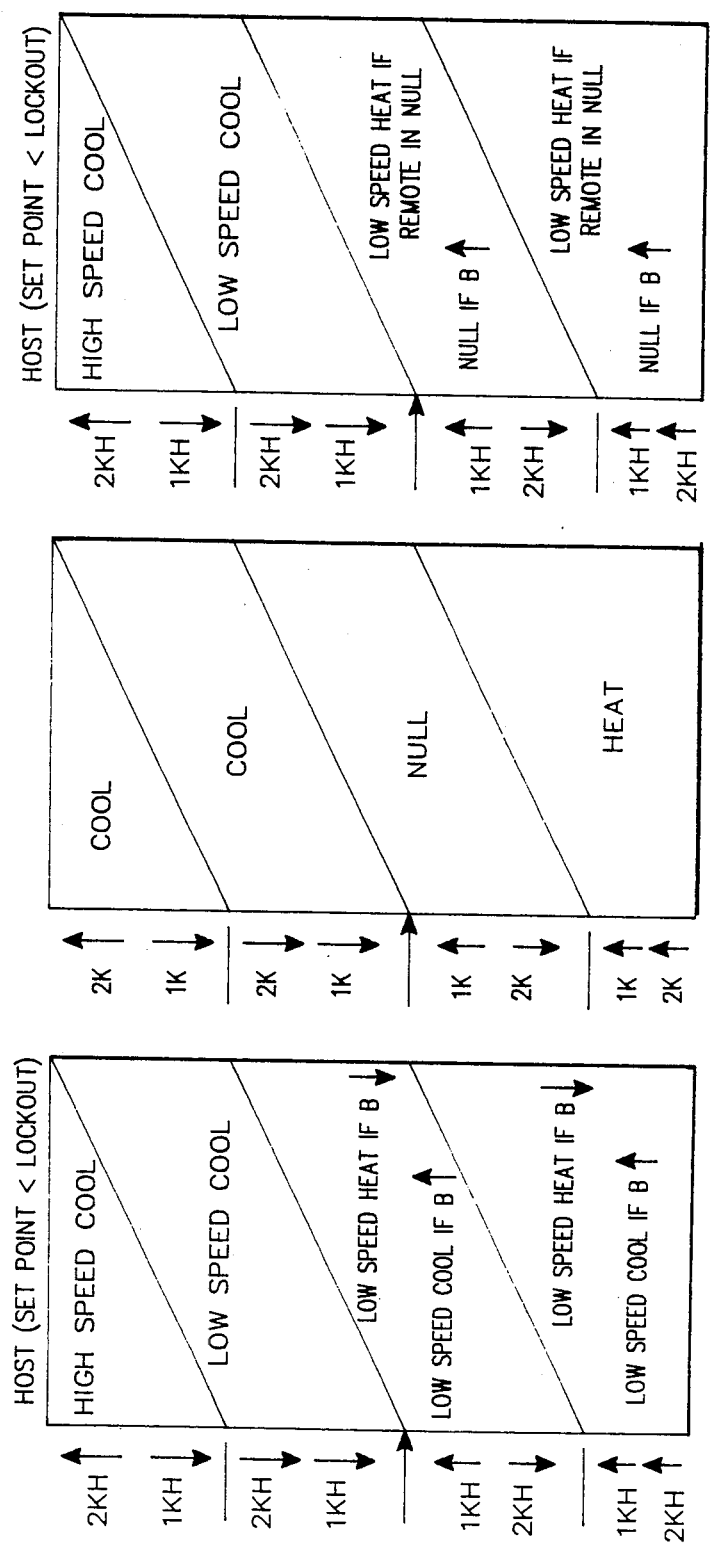
FIG. 4 illustrates the operation of the host unit according to an embodiment of FIG. 3 in which a host liquid line solenoid is not utilized in the control scheme.
FIG. 5 illustrates the operation of the remote unit.
FIG. 6 illustrates the operation of the host unit according to another embodiment of the invention in which a normally open host liquid line solenoid is utilized in the control scheme.

The host unit 14 includes a thermostat 88 having a temperature control module TCMH, a temperature sensor 90 disposed in the front compartment 12, a heat relay 1KH and a speed relay 2KH. FIG. 4 is a diagram which illustrates the sequence in which the heat relay 1KH and the speed relay 2KH normally operate, with the sequence for a falling temperature descending along the left side of the diagram, and with the sequence for a rising temperature rising along the right side of the diagram. An upwardly pointing arrow indicates the associated relay is energized, and a downwardly pointing arrow indicates the associated relay is dropped out. When the speed relay 2KH is energized, the throttle of the prime mover 30 is in the high speed position, and when the speed delay 2KH is deenergized, the throttle of the prime mover 30 is in the low speed position. When the heat relay 1KH is deenergized, a cooling mode is selected, and when the heat relay 1KH is energized, a heat mode is selected. The condenser and evaporator fan circuits, as well as the defrost circuits are not shown in FIG. 3 in order to simplify the schematic. The various heating, cooling and null modes are shown in the diagram for a continuous run operation. It is also possible to operate the system with modes in which the compressor is not run continuously, as described in incorporated U.S. Pat. No. 4,419,866.

The remote unit 24 includes a thermostat 92 having a temperature control module TCM, a temperature sensor 94 disposed in the rear compartment 20, a heat relay 1K and a speed relay 2K. FIG. 5 is a diagram similar to that of FIG. 4 except illustrating the operation of the heat and speed relays 1K and 2K, respectively, and the associated heat, cool and null modes. A "null" mode indicates the heating and cooling requirements are satisfied, and the temperature of the air in the associated compartment is within a predetermined small band relative to the temperature set point selected on the associated thermostat.

In the normal operation of the thermostats 88 and 92, which thermostats are commercially available from the assignee of the present application, if a temperature set point is selected which is below a predetermined value, called the lock-out po.int, which may be in the range of 15 to 20 degrees F., for example, the high speed heat mode is locked out, but low speed heat is still normally a viable mode which is initiated when the temperature is in a predetermined range below the set point. In the present invention, if a set point is selected for the host unit which is below the lock-out point, all host unit heat modes are locked out when the host unit receives a signal from the remote unit that the remote unit is in a cooling mode. This signal may be provided by heat lock out relay 3K which is connected to be energized by the same voltage which energizes the remote liquid line valve B when the temperature set point is below lock out. Thus, when the set point is below lock out and the remote liquid line valve B is energized to initiate a cooling mode in remote unit 24, the heat lock-out relay 3K is simulaneously energized. Contacts 3K-1 and 3K-2 of the heat lock-out relay 3K are connected to cut out all heat modes when the remote unit 24 calls for a cooling mode and the temperature set point is below the lockout point. While the host heat modes are locked out, the host unit is in low speed cool when it would otherwise be in a heat mode.

More specifically, a battery 96 energizes a pair of conductors 98 and 100, and the host and remote thermostats 88 and 92 are each connected between them. A throttle solenoid TS which controls the speed selection of the prime mover 30 is connected between the conductors 98 and 100 via normally open contacts 2KH-1 of the speed relay 2KH and normally closed contacts 1KH-3 of the host heat relay 1KH. When the speed relay 2KH is picked up, contacts 2KH-1 close, and, if relay 1KH is dropped out, the throttle solenoid TS will be energized to advance the throttle to the high speed position. When the speed relay 2KH drops out, contacts 2KH-1 open and the solenoid TS moves the throttle to the low speed position.

The pilot solenoid PS is connected across conductors 98 and 100 via normally open contacts 1KH-2 of the heat relay 1KH and normally closed contacts 3K-3 of the heat lock-out relay 3K. When the heat relay 1KH is dropped out the pilot solenoid PS is deenergized and the three-way valve 32 is in the cooling position. When the heat relay 1KH picks up, its contacts 1KH-2 close, and, if the relay 3K is dropped out, the pilot solenoid PS will be energized, which applies compressor pressure to the associated threeway valve 32 to shift it to the heating position.

The normally closed remote liquid line solenoid operated valve B is connected across conductors 98 and 100 via normally closed contacts 1K-2 of the heat relay 1K. When heat relay 1K is dropped out, contacts 1K-2 are closed, solenoid valve B is energized to open the valve and the remote unit 24 is in a cooling mode. When heat relay 1K picks up, contacts 1K-2 open, solenoid valve B drops out to close the valve and terminate the remote cooling mode. It will be noted from FIG. 3 that the normally closed remote suction line solenoid valve C is connected to be energized by the same voltage which energizes the remote liquid line solenoid valve B, and the heat lock-out relay 3K is also connected to be responsive to the voltage applied to liquid line solenoid valve B, and to the location of the temperature set point relative to the predetermined heat lock-out temperature.

The normally closed remote hot gas solenoid A is connected across the conductors 98 and 100 via serially connected normally open contacts 1K-1 and 2K-1 of the heat and speed relays 1K and 2K, respectively. When either or both of the heat and speed rlays 1K and 2K are dropped out, solenoid valve A will be deenergized and closed, preventing a defrost of a heat cycle. Both the heat and speed relays 1K and 2K, respectively, must be energized before the hot gas line 82 to the remote unit 24 will be opened by the remote hot gas solenoid A. It will be noted from FIG. 3 that the normally open condenser inlet solenoid valve D is connected to be energized by the same voltage which energizes the remote hot gas solenoid A.

In the operation of the transport refrigeration system according to the first embodiment of the invention, it will be assumed that the set point of the host unit 14 is below the heat lock-out temperature. This will be the normal situation, as the host unit 14 will normally be controlling the temperature of a frozen load to a predetermined temperature below 0 degrees F.

When the thermostat 92 of the remote unit 24 calls for a cooling mode, the heat relay 1K will drop out, contacts 1K-2 will close, the remote liquid line solenoid valve B will open to allow liquid refrigerant from the host unit 14 to enter the remote evaporator coil 74, the remote suction line valve C will energize and thus open to allow suction gas to be returned to the accumulator 54 by the host compressor 28, and the heat lock out relay 3K will pick up to lock out all heat modes, i.e., both low speed and high speed heat, in the host unit 14. In addition, valves A and D will be deenergized and thus closed and open, respectively. Depending on how far the actual compartment temperature is above the set point, the cooling mode may be high speed cool, or low speed cool, and the remote cooling process will not be interfered with by the host unit going into a heating mode, as all heat modes have been locked out by the heat lock-out relay 3K, i.e., the pilot solenoid PS cannot be energized to switch the three-way valve 32 to the heat position. Thus, the host unit 14 will remain in a cooling mode all the time the remote unit 24 is in a cooling mode. Once the temperature needs of the remote unit 24 are satisfied, the suction and liquid line solenoids B and C will drop out, returning the remote unit to a null mode in which both the remote liquid line 80 and the remote hot gas line 82 are closed by valves B and A, respectively. The host unit 14 will now be able to control to its temperature set point by cycling between low speed cool and low speed heat. The fact that the host unit cannot provide heat while the remote unit is in cool is not significant, since the host unit will normally be controlling a frozen load.

When the thermostat 92 of the remote unit 24 calls for heat, the heat relay 1K and the speed relay 2K will both be energized as shown in FIG. 5, which relays energize the normally closed remote hot gas solenoid valve A and the normally open condenser inlet solenoid valve D. Solenoid valves B and C will both be deenergized and thus closed. The heating mode of the remote unit will thus be highly effective whenever the host unit 14 is in a cooling mode, as all of the hot, high pressure discharge gas from the compressor 28 will be forced to flow to the remote evaporator unit 24. The circuit will include the host hot gas line 36, the remote hot gas line 82, the evaporator coil 74, and since valves C and D are both closed, the check valve CV2 will be open and the check valve CV1 will be closed, directing the output of the remote suction line 84 directly into the receiver tank 40. This arrangement not only prevents short circuiting the receiver, but it also increases the pressure in the receiver tank to force more liquid out of the receiver and increase the supply of refrigerant available for the remote heating mode. The heating mode of the remote unit 24 is thus highly effective, as all of the hot compressor discharge gas is directed to the remote unit 24, and more refrigerant is forced from the receiver into the active heating cycle. Defrost of the remote unit 24 will be the same as the heating mode, except the remote unit's evaporator fans will be turned off.

The invention may be fine tuned to the needs of any specific situation by selective use of the heat lockout relay 3K, and/or adding condenser shutters to the host unit 14. The system is independent of the refrigerant used, but R-502 will enhance the heating capabilities of the remote unit 24.

The second embodiment of the invention, which differs from the first embodiment by the addition of the host unit liquid line valve F, is rendered effective by closing switch 87. The solenoid valve F is connected such that the host liquid line 42 cannot be closed by valve F, unless refrigerant is being circulated to the remote unit 24. The host liquid line valve F is connected between conductors 98 and 100 via normally open contacts 1KH-1 of the host heat relay 1KH and the normally open contacts 3K-4 of the heat lock-out relay 3K. Thus, when refrigerant is being circulated to the remote unit 24 for cooling purposes, the host unit 14 is allowed to go into a null mode by energizing valve F, if the host unit's cooling requirements are satisfied. FIG. 6 illustrates the modes of the host unit 14 when operating according to the second embodiment. The operation of the remote unit 24 will be the same as illustrated in the diagram of FIG. 5.

In the operation of the second embodiment, if both the host and remote units are calling for cooling, liquid line solenoids B and F would both be open, allowing their respective evaporators to provide cooling. If the host unit 14 reaches its temperature set point before the remote unit reaches its set point the heat relay 1KH picks up and the host liquid line solenoid F closes. This shuts off refrigerant to the host unit's evaporator coil 52, allowing the host unit to maintain temperature at set point without being forced to stay in a cooling mode, and without going into a heat mode. The remote unit 24 can thus continue to cool until it reaches its set point. If the remote unit 24 reaches its set point while the host unit 14 is still satisfied, i.e., in null, the dropping out of the heat lock-out relay 3K when solenoid valve B drops causes the liquid line solenoid F to re-open at the same instant that the remote liquid line solenoid B closes. The host unit would then maintain set points by cycling between low speed cool and low speed heat.

If both the host and remote units are cooling and the remote unit reaches its set point while the host unit still requires cooling, liquid line solenoid valve B would close while liquid line solenoid valve F would remain open. When the host unit 14 reaches its set point, the liquid line solenoid valve F would remain open, and the host unit will then maintain its setpoint by cycling between low speed cool and low speed heat. If the remote unit 24 should require cooling while the host unit 14 is in a heat mode, the liquid line solenoid valves F and B would close and open, respectively, the heat lock-out relay 3K would pick up and cause the pilot solenoid PS to drop out, returning the three-way valve 32 of the host unit 14 to the cooling position, until the cooling needs of the remote unit are satisfied. Thus, the system would always operate to circulate refrigerant through the compressor 28, with the heating and cooling needs of the remote unit both taking precedence over the heating needs of the host unit. Also, the fact that the host unit can go into null to maintain setpoint, allows the cooling needs of the remote unit to be better served during this period.

We claim as our invention:

1. A compartmentalized transport refrigeration system, comprising:
   a trailer having a first compartment,
   a host refrigeration unit for controlling the air temperature of said first compartment via heating, cooling and null modes,
   said host unit comprising a closed fluid circuit which includes a compressor, condenser, receiver, evaporator, accumulator, and liquid, hot gas and suction lines,
   first means for selectively enabling and blocking fluid flow from the high pressure side of said compressor to said condenser when said host unit is in a cooling mode,
   a second compartment in said trailer,
   a remote evaporator for controlling the air temperature of said second compartment via heating, cooling, and null modes,
   said remote evaporator including liquid, hot gas and suction lines connected to the liquid, hot gas and suction lines, respectively, of said host unit,
   second, third and fourth means for respectively and selectively enabling and blocking fluid flow between said remote liquid, hot gas and suction lines and said host unit,
   one-way by-pass means interconnecting the suction line of said remote evaporator and the receiver of said host unit,
   and control means for selecting the fluid blocking positions of said first, second and fourth means when the third means connects the hot gas line of the host unit to the remote evaporator, to direct the output of the compressor to the remote evaporator and cause the one-way by-pass means to connect the remote suction line to the receiver, to enhance the heating capability of the remote evaporator.

2. The transport refrigeration system of claim 1 including means for preventing the host unit from initiating a heating mode when the second means initiates a remote cooling mode and the host unit is controlling to a temperature below a predetermined value.

3. The transport refrigeration system of claim 1 including fifth means in the liquid line of the host unit for selectively enabling and blocking fluid flow from the receiver to the evaporator, and wherein the control means includes means for cycling said fifth means to control air temperature in the first compartment by cooling and null modes when the second means is providing a cooling mode in the remote evaporator, and means for preventing the fifth means from blocking the host liquid line while the remote unit is in a null mode.

* * * * *